Feb. 28, 1967    M. M. KENNEDY    3,306,056
AIR CONDITIONING AND REFRIGERATION SYSTEMS
FOR USE IN AUTOMOBILES
Filed Aug. 9, 1965    3 Sheets-Sheet 1

INVENTOR.
MILDRED M. KENNEDY
BY
Dunlap & Laney
ATTORNEYS

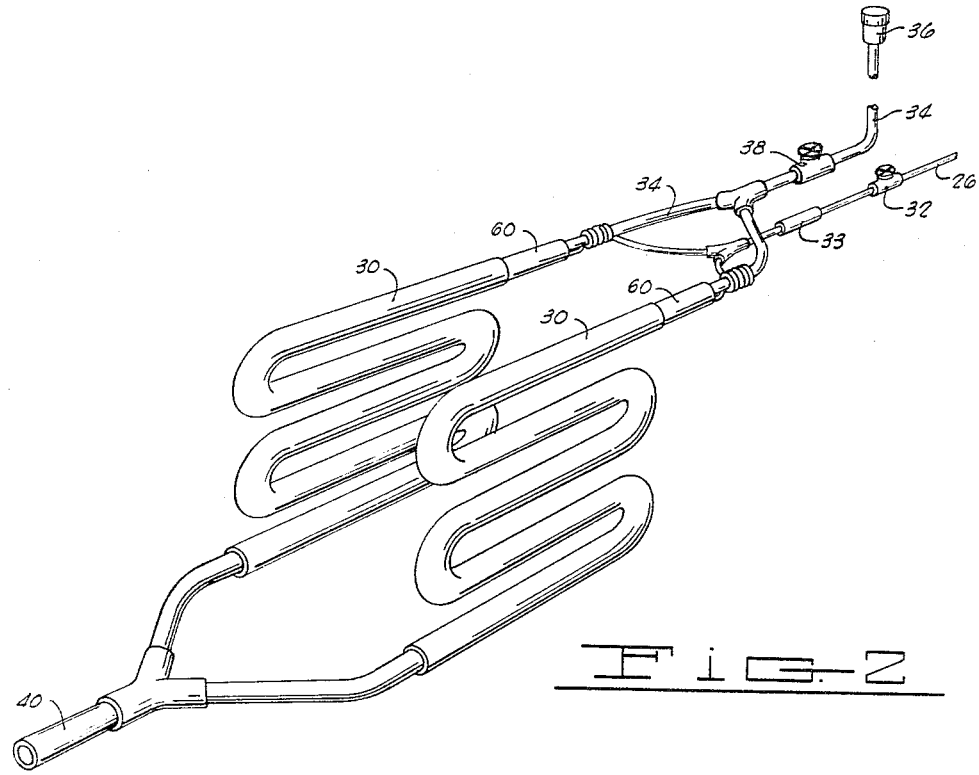
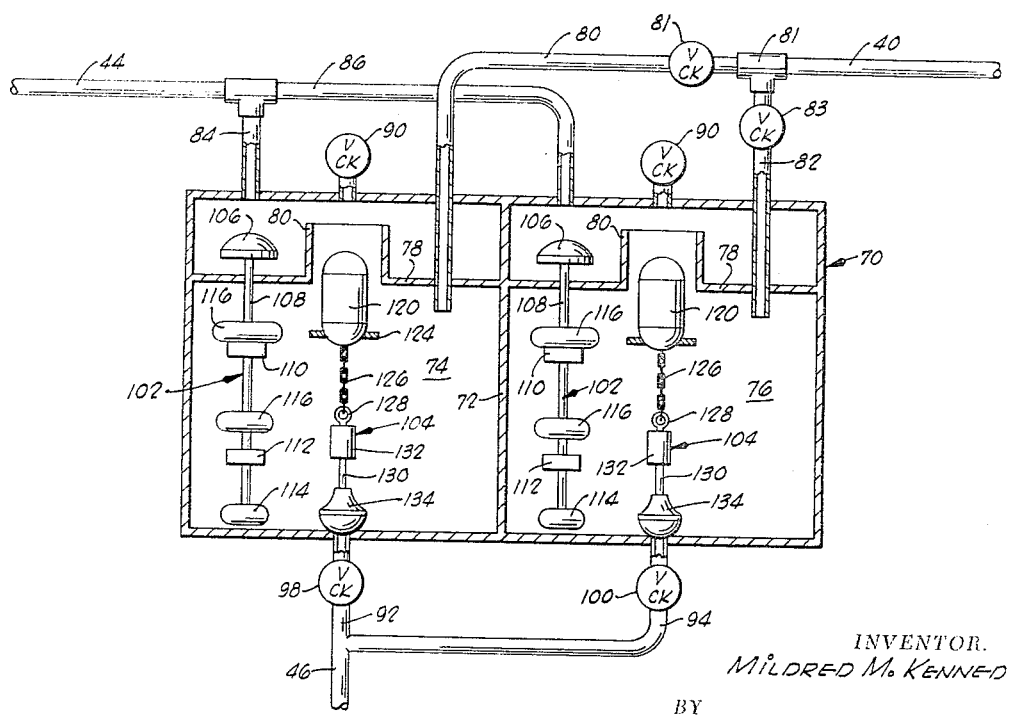

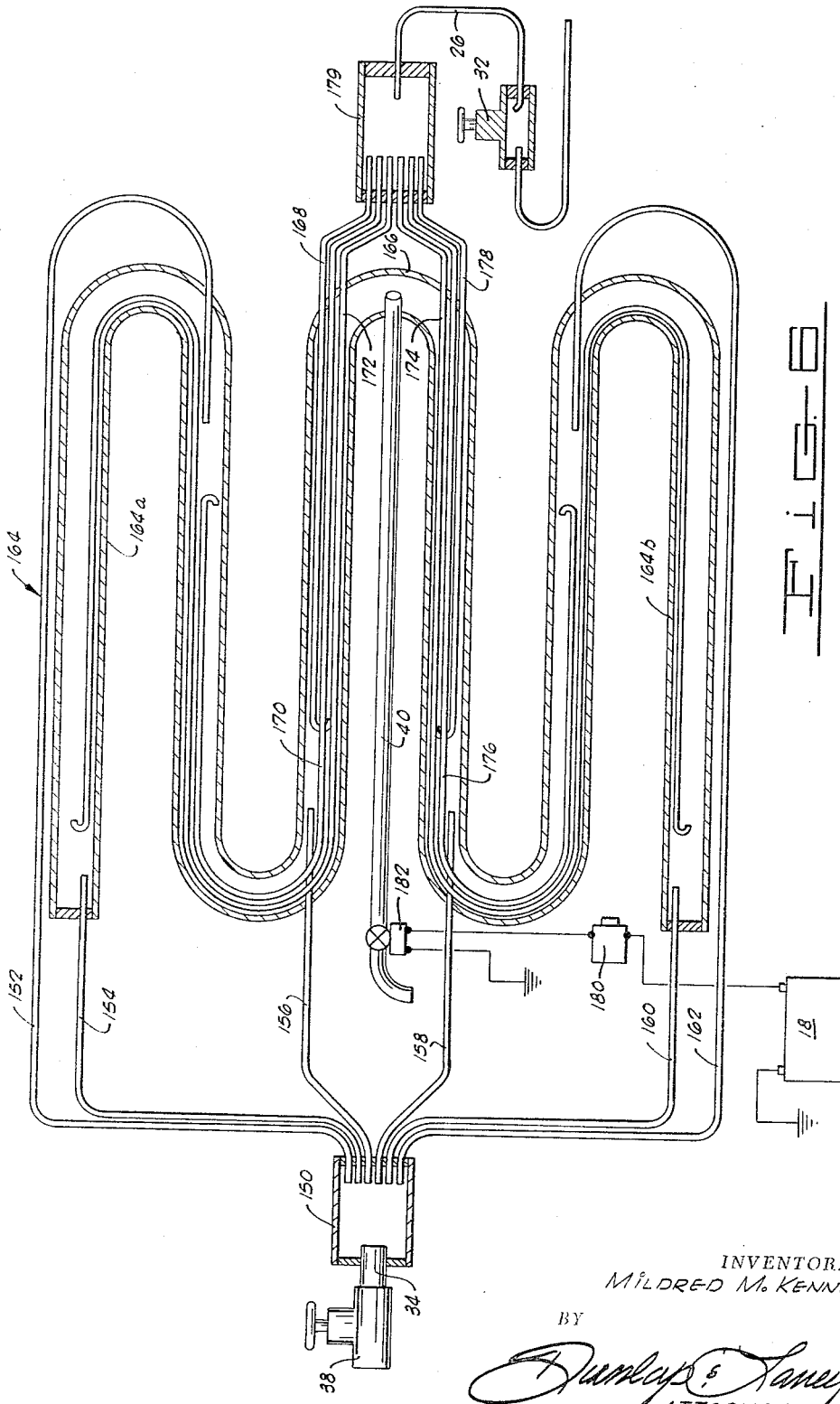

United States Patent Office 3,306,056
Patented Feb. 28, 1967

3,306,056
AIR CONDITIONING AND REFRIGERATION
SYSTEMS FOR USE IN AUTOMOBILES
Mildred M. Kennedy, 1706 Clark, Parsons, Kans. 67357
Filed Aug. 9, 1965, Ser. No. 478,332
13 Claims. (Cl. 62—7)

This invention relates to heat exchange devices which can be operated utilizing the fuel of an internal combustion engine as the primary heat exchange medium. More particularly, the present invention relates to air conditioning and refrigeration devices constructed for installation in automobiles and utilizing the gasoline fuel of the automobile as the primary heat exchange medium.

A great deal of work has been done and many patents have been issued on air conditioning and refrigeration systems for automobiles in which such systems are intended to be operated using the gasoline fuel of the automobile for a coolant. These devices have, in general, been predicated upon the principle of throttling or expanding the liquid gasoline through a small orifice to a reduced pressure so that the liquid gasoline is converted to vapor and, in so doing, absorbs its latent heat of vaporization from the surrounding environment. The reduced pressure necessary for converting the gasoline to a vapor has been provided, in most instances, by vacuum produced by the engine of the automobile, and has involved the concurrent vaporization of the gasoline, and mixing of the gasoline vapor with an air stream drawn through a common tubing coil by the source of vacuum. In many devices of this type, the mixture of gasoline and air has been directed from the refrigeration or air conditioning coils into the intake manifold of the engine where it mixes with fuel and air from the carburetor and undergoes combustion. Two major problems have characterized systems of the type described, and have generally been of sufficient magnitude that the air conditioning and refrigeration systems heretofore proposed have not been widely accepted. One of the difficulties which has continued to confront designers of systems of these types has been that of the tendency of the refrigeration coil to freeze up and to become choked due to the accumulation of ice within the coil as water in the gasoline or, more likely, in the air which is mixed therewith, is frozen into small crystals. At times, the ice chokes the orifice in the gasoline intake conduit through which the gasoline is expanded, resulting in a complete or near complete cutoff of the fuel refrigerant to the heat exchange apparatus.

Another disadvantage which has been characteristic of the types of refrigeration and air conditioning systems under discussion is the adverse effect which the operation of the system has on the idling of the engine when it is undertaken to operate the system while the engine is merely idling. None of the systems with which I am acquainted permit the engine to idle smoothly and without being affected while the system is being operated. Moreover, practically all of the systems which have heretofore been proposed and, to some extent, utilized have resulted in a substantial increase in the gasoline consumption of the automobile due to the less efficient operation of the engine which occurs as a result, apparently, of the circulation of the mixed air and vaporized fuel from the refrigeration coil directly to the carburetor, or to the intake manifold of the engine.

The present invention provides an improved heat exchange apparatus for installation in automobiles, and for operation using as the refrigerant, the gasoline fuel used to operate the automobile. The total consumption of gasoline resulting when the refrigerator or air conditioning apparatus of the invention is used concurrently with the operation of the automobile is substantially less than that which has been characteristic of the use of devices of this type as previously constructed, and the system is arranged so that little or no effect upon the idling of the engine is experienced when the system is in operation. The invention is also susceptible to use in campers of the type mounted on truck beds and in mobile homes and trailers, in each case using gasoline as the refrigerant.

Broadly described, the present invention comprises a heat exchange tubing coil having a gasoline inlet conduit extending into the coil from one end thereof with the gasoline inlet conduit connected at its end outside the heat exchange coil to the gasoline storage tank of the automobile; an air induction line open to the atmosphere at one of its ends and having its other end extended into the heat exchange coil and terminating in spaced relation to the end of the gasoline inlet conduit inside the coil; a source of vacuum; a vacuum conduit connecting said source of vacuum to the heat exchange coil for reducing the pressure therein over a major portion of the length of the coil; a trap in the vacuum conduit between the source of vacuum and the heat exchange coil for trapping liquid gasoline pulled from the heat exchange coil through the vacuum conduit toward the source of vacuum; a gasoline return line connected between the trap and the gasoline storage tank on the automobile; and a check valve in the gasoline return line for preventing the flow of gasoline from the storage tank to the trap when the vacuum conduit is evacuated by the source of vacuum, and for permitting the flow of gasoline from the trap to the storage tank when the source of vacuum is de-energized.

In a preferred embodiment of the invention, an auxiliary vacuum pump is provided and is connected to the trap for pulling a vacuum therethrough from the heat exchange coil. The auxiliary vacuum pump can be operated by electrical power from the storage battery used to operate the automobile, and is employed when the engine of the automobile is not in operation.

In yet another embodiment of the invention constructed especially for facilitating extended usage of the refrigeration system, the trap which is employed for preventing liquid gasoline from entering the intake manifold of the engine is a double-chambered vacuum tank. Valving is provided in each of the chambers of the vacuum tank for interrupting the vacuum thereto and opening the drain and check valve therefrom when the chamber is substantially filled with liquid gasoline. Simultaneously, the second chamber is placed on stream in the vacuum line and is allowed to commence filling with gasoline while the first chamber is emptied by returning the gasoline accumulated therein to the gasoline storage tank of the automobile.

An important object of the present invention is to provide an improved refrigeration and/or air conditioning system for use in an automobile, which system utilizes the gasoline fuel of the automobile as the main heat exchange medium used in the refrigeration system.

Another object of the present invention is to provide a gasoline operated refrigeration and air conditioning system for an automobile which is not subject to freezing up or becoming inoperative as a result of condensation or solid particle formation during extended periods of usage.

A further object of the present invention is to provide a gasoline operated refrigeration and air conditioning system for an automobile, which system can be operated continuously for extended periods of time with little or no consumption of gasoline fuel during such operation.

Another object of the present invention is to provide a refrigeration and air conditioning system for use on automobiles and which is operated by the gasoline fuel from the automobile in such a way that the idling of the engine of the automobile is affected to a minimum degree.

In addition to the foregoing described objects and advantages of the invention, additional objects and advantages will become apparent as the following detailed description of the invention is considered in conjunction with the accompanying drawings which illustrate the invention.

In the drawings:

FIGURE 2 is a perspective view of the heat exchange coil portion of a refrigeration system constructed in accordance with the present invention, the embodiment of the invention illustrated in FIGURE 2 being a double coil arrangement.

FIGURE 5 is a detail view showing the construction of a double chambered vacuum tank used in a preferred embodiment of the invention.

FIGURE 6 is a diagrammatic view of a modified heat exchange coil which is constructed in accordance with the invention and further illustrating a thermostatic control used in conjunction with the heat exchange coil.

Figure 1:
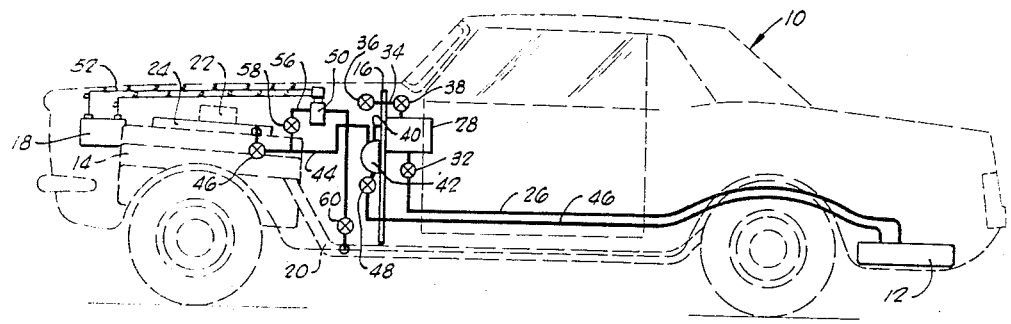
FIGURE 1 is a schematic view of the refrigeration system of the present invention as the same is utilized on an automobile. The automobile is shown in dashed lines.

Referring now to the drawings in detail, and particularly, to FIGURE 1, an automobile 10 is provided with the usual gasoline storage tank 12, engine 14, fire wall 16 and storage battery 18. An exhaust pipe 20 extends rearwardly beneath the automobile from the engine 14. The engine is provided with the usual carburetor 22 and intake manifold 24.

The present invention includes a gasoline inlet conduit 26 which extends forwardly in the automobile from the gasoline storage tank 12 and enters the refrigerator housing 28 which is secured to the rear side of the fire wall 16 and beneath the dashboard of the car. The refrigerator housing 28 includes one or more heat exchange coils 30 which will be described in greater detail hereinafter. A control valve 32 is interposed in the gasoline inlet conduit 26 between the refrigerator housing 28 and the gasoline storage tank 12 for purposes of controlling the gasoline flow to the heat exchange coil 30.

An air induction line 34 extends from the refrigerator housing 28 to the top or side of the hood of the automobile where its end is open to the atmosphere. A check valve 36 is provided in the free end of the air induciton line 34 for purposes hereinafter to be described, and a control valve 38 is interposed in the air induction line for controlling the amount of air introduced to the heat exchange coil 30, also as hereinafter described.

Figure 4:
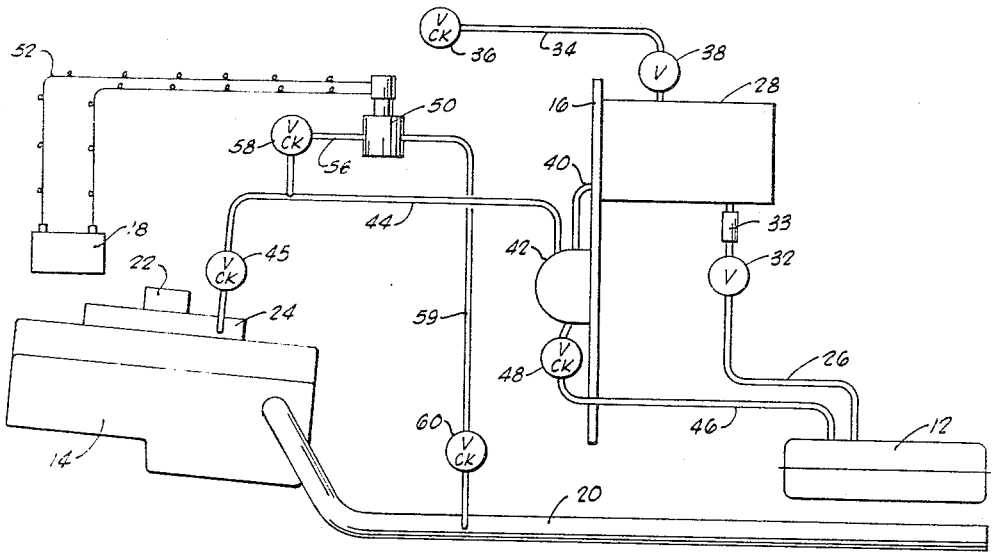
FIGURE 4 is an enlarged diagrammatic view of a refrigeration system constructed in accordance with the present invention.

Extending from the heat exchange coil 30 located inside the refrigeration housing 28 is also a first vacuum conduit 40 which passes to a gasoline trap which, in the illustrated embodiment, takes the form of a vacuum tank 42 mounted to the forward side of the fire wall 16. The vacuum tank 42 is preferably flattened or monoplanar on one side thereof as shown in FIGURE 4 to facilitate mounting to the fire wall. A second vacuum conduit 44 extends from the vacuum tank 42 through a suitable check valve 45 to the intake manifold 24 of the engine 14. A gasoline drain or return line 46 extends from the bottom of the vacuum tank 42 to the gasoline storage tank 12 and is provided with a check valve 48, the function of which will subsequently be explained.

A preferred embodiment of the invention includes an auxiliary vacuum pump 50 which is operated by electrical current delivered from the storage battery 18 by electrical leads 52. The auxiliary vacuum pump 50 is connected into the vacuum conduit 44 by a conduit 56 which is provided with a check valve 58. The exhaust from the vacuum pump 50 is conveyed via a suitable conduit 59 into the exhaust pipe 20 of the automobile through a suitable check valve 60.

Figure 3:
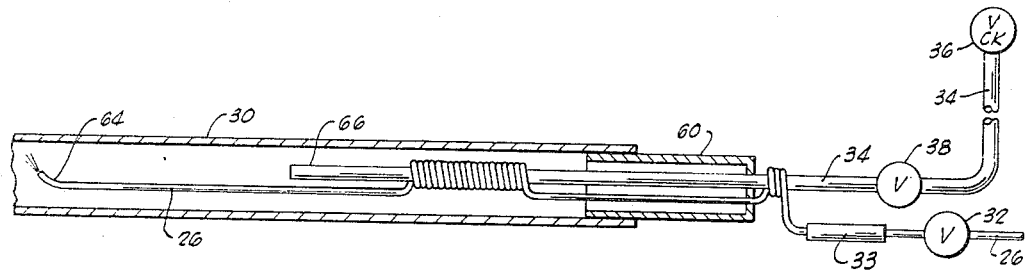
FIGURE 3 is a detail sectional view of the structure used for passing gasoline and air into the heat exchange coil of the invention, and for intermixing these materials therein as the gasoline is expanded from the liquid to a vapor state.

The details of the construction of the heat exchange coil 30, and the manner in which the air induction line 34 and gasoline inlet conduit 26 are mounted therein can best be perceived by referring to FIGURES 2 and 3. In referring to these figures, it should be pointed out that FIGURE 3 illustrates the construction employed when a single bank of heat exchange coils is employed, whereas the arrangement depicted in FIGURE 2 is the dual bank arrangement which is preferably utilized in most refrigeration and air conditioning systems for use on automobiles. The principle employed, however, is the same in both instances, and it is believed that it will be readily apparent from the description of the drawings, that where a plurality of heat exchange coils 30 are utilized, a mere duplication of the equipment and arrangement used in the single coil is employed.

The gasoline inlet conduit 26 is preferably constructed of capillary tubing having an inside diameter of about 0.031 inch. The capillary tubing is extended from the gasoline storage tank 12 through a control valve 32 and through a filter and drying element 33. The air induction line 34 is extended from a point on the automobile where clean atmospheric air is available through a control valve 38, with a suitable check valve 36 being provided at the free end of the air induction line to prevent leakage of gasoline fumes therefrom when the refrigeration system is not in operation. The air induction line 34 which is employed is preferably about ⅛ inch in diameter.

The capillary tubing constituting the gasoline inlet conduit 26 is wrapped several times around the air induction line 34 for stability and then both the air induction line and capillary tubing are passed through the closed end of a fitting 60 having a diameter of ⁵⁄₁₆ inch which fits snugly within the heat exchange coil 30 which is preferably tubing of ⅜ inch inside diameter. The described arrangement effectively seals the end of the heat exchange coil 30 and provides a firm support for the gasoline inlet conduit 26 and the air induction line 34.

Several inches inwardly from the end of the heat exchange coil 30, the capillary tubing constituting the gasoline inlet conduit 26 is wrapped tightly around the air induction line 34 in a number of turns and then is extended further inwardly from the end of the air induction line to a point of termination 64. The distance which the capillary tubing of the gasoline inlet conduit 26 extends beyond the end 66 of the air induction line 34 is preferably from about 1 to 2 inches, and best results have been obtained when this spacing is about 1½ inches. It is important that the end 64 of the gasoline inlet conduit 26 be directed away from or at least not toward the end 66 of the air induction line 34 since I have found that an arrangement in which the gasoline is ejected from the conduit 26 in a direction toward the air intake line 34 results in freezing up of the system after a relatively short period of use.

In referring to FIGURE 2 of the drawings, it will be perceived that the vacuum conduit 40 is connected to the opposite ends of the heat exchange coils 30 from the ends which receive the air induction lines 34 and the gasoline inlet conduits 26.

In the operation of the system, when a vacuum is applied to the vacuum conduit 40, the pressure within the heat exchange coil or coils 30 is substantially reduced with the result that air is drawn into the heat exchange coils through the air induction line 34. The check valve 36 at the end of the air induction line is constructed to permit passage of the air into each heat exchange coil 30 due to the suction developed therein, but will prevent the escape of gasoline vapors from inside the heat exchange coil 30 to the atmosphere when the system is not in operation.

The reduced pressure developed within the heat exchange coils 30 also effectively flashes or vaporizes gasoline drawn into the coil through the gasoline inlet conduit 26, with the result that, upon the sudden expansion of the gasoline, and mixture with air drawn into the heat exchange coil through the air induction line 34, the gasoline absorbs from the surrounding atmosphere, its latent heat of vaporization and a marked cooling effect results. This cooling effect is continued over the length of the heat exchange coil 30 so that the entire surface thereof becomes cooled.

The manner in which the vacuum developing, and gasoline return, portions of the system operate can best be understood by referring to FIGURES 1 and 4. In the preferred embodiment of the invention illustrated in FIGURE 1, a vacuum may be developed by either of two sources. When the automobile is operating at relatively high speeds, it is preferable to employ the vacuum developed in the intake manifold of the engine for pulling the vacuum on heat exchange coil 30. At this time, the check valve 45 is opened, and a vacuum is pulled through the vacuum tank 42 and the vacuum conduit 40 on the heat exchange coil or coils within the refrigeration housing 28.

As the mixture of gasoline and air is exhausted under vacuum from the heat exchange coil 30, it enters the vacuum tank 42 which functions as a trap to remove any liquid gasoline which may have recondensed and moved from the heat exchange coil 30 into the vacuum conduit 40. Such liquid gasoline would detrimentally affect the operation of the engine 14 if drawn into the intake manifold 24. Liquid gasoline thus accumulates in the bottom of the vacuum tank 42. During operation of the system, the vacuum pulled on the vacuum tank 42 will effect the closure of the check valve 48 in the gasoline return line 46 so that no gasoline can return to the gasoline storage tank 12. On the other hand, when the engine is stopped, or when the refrigeration system is not in use, the vacuum acting on the vacuum tank 42 is interrupted, permitting the check valve 48 to open and gasoline to drain rearwardly to the gasoline storage tank 12. This drainage is effected under gravity, and the vacuum tank 42 should therefore be positioned at a point which is higher than any point in the gasoline return line 46.

It has been my experience that some difficulty may be encountered in operating the refrigeration or air conditioning system of the invention from the vacuum developed by the engine at times when the engine is idling. The difficulty is in the nature of the development of a rough idle in the engine, with occasional complete stoppages. To obviate this problem, the system incorporates an auxiliary vacuum pump 50 which can be energized by a suitable switch (not shown) on the dashboard of the automobile at such times as the engine is merely idling or at times when the automobile is not in use and the engine is stopped. The auxiliary vacuum pump 50 is any suitable type requiring a relatively small supply of electrical current, such as the vacuum pumps produced and marketed by the Trico Products Corporation of Buffalo, New York, or the Walker Manufacturing Company of Racine, Wisconsin. These pumps can be operated by the power supplied by the storage battery of the automobile, as illustrated in FIGURE 1.

When the engine is idling or is stopped, and the auxiliary vacuum pump 50 is energized, the vacuum developed by the pump opens a check valve 58 in the conduit 56, and effectively closes the check valve 46 in the vacuum conduit 44 extending between the intake manifold and the vacuum tank 42. A vacuum is thus pulled on the vacuum tank 42 by the auxiliary vacuum pump 50 via the conduit 56, and the system is thus operated entirely on vacuum developed by the auxiliary vacuum pump. The exhaust from the vacuum pump 50 is discharged through the line 59 into the exhaust pipe 20 of the automobile through a suitable check valve 60 which functions to prevent combustion gases from the exhaust pipe from passing upwardly through the line 58 when the auxiliary vacuum pump 50 is not in operation.

In some instances, particularly in hot climates, it may be desirable on extended trips in an automobile incorporating the present invention to provide means for extended continued operation of the refrigeration or air conditioning system without the necessity to stop the operation of the system to permit gasoline to drain from the vacuum tank 42 through the gasoline return line to the gasoline storage tank 12. To provide for such extended operation, as well as to decrease the detrimental effect of operation of the refrigeration and air conditioning system at times when the engine is idling, a double vacuum tank of the type illustrated in FIGURE 5 is preferably utilized. The double vacuum tank includes a housing 70 which is provided with a central partition 72 which divides the housing into a pair of substantially equal-volumed chambers 74 and 76. Disposed within the upper portion of each of the chambers 74 and 76 is a baffle plate 78 which is provided with an open chimney 80 which extends upwardly therefrom for a purpose hereinafter described.

It will be noted in referring to FIGURE 5 that the first vacuum conduit 40 from the heat exchange coil extends into a T 81, and that a first branch vacuum conduit 80 extends into the chamber 74, and a second branch vacuum conduit 82 extends into the chamber 76. The branch vacuum conduits 80 and 82 each terminate within the chambers 74 and 76 at points below the baffles 78, and the baffles are sealed around each of the branch vacuum conduits. The branch vacuum conduits 80 and 82 are each provided with check valves 81 and 83, respectively, just downstream from the T 81 for a purpose later to be described.

The second vacuum conduit 44 which extends to the intake manifold 24 of the engine 14 also extends into a T where the double chamber vacuum tank is utilized, and a first branch 84 of the vacuum conduit 44 extends into the top of the chamber 74 and a second branch 86 extends into the upper portion of the second chamber 76. Positioned in the top of the housing 70 above each of the chambers 74 and 76 is a check valve 90, and these check valves function to prevent the ingress of atmospheric air to the chambers 74 and 76 when a vacuum is being pulled by the branch conduits 84 and 86 in the respective chambers as hereinafter described.

Extending from the bottoms of the chambers 74 and 76 are branches 92 and 94, respectively, of the gasoline return line 46 which, as previously explained, returns gasoline from the vacuum tank to the gasoline storage tank 12. Positioned in the branches 92 and 94 of the gasoline return line 46 are a pair of check valves 98 and 100, respectively, which function to prevent gasoline from entering the vacuum tank from the gasoline storage tank 12.

In each of the chambers 74 and 76 are liquid level control elements which include a vacuum control float system 102 and a gasoline drain control system 104. The vacuum control float systems 102 each include an arcuate seat 106 positioned at the upper end of a shaft 108 which is mounted for vertical sliding movement in a pair of brackets 110 and 112. A resilient cushion 114 is provided on the lower end of each of the rods 108 for a purpose hereinafter explained. A pair of vertically spaced floats 116 are secured to each of the rods 108. The rods 108 each pass through a seal in the baffle plates 78 and are aligned with the branches 84 and 86 of the vacuum conduit 44.

Each of the gasoline drain control systems 104 includes a float 120 which is configured to seat upon a float seat 124, and which is secured to one end of a flexible member such as a chain 126. The other end of the chain 126 is attached to an eye 128 secured to the upper end of a rod 130 which is slidably mounted in a bracket 132 secured to the housing 70. At the lower end of the rod 130, a floating seat 134 is provided. The floating seats 134 are configured to seat over, and seal the respective branches 92 and 94 of the gasoline return line 46.

In the operation of the double chamber vacuum tank, vacuum is applied to the system via the vacuum conduit 44 by either the intake manifold 24 of the engine 14 of the automobile, or by an auxiliary vacuum pump as hereinbefore described. Assuming, for purposes of explanation, that in the case of the chamber 74, operation of the system is commenced with the arcuate seat 106 covering the open end of the branch 84 of the vacuum conduit 44, the vacuum is then applied through the branch vacuum 86 to the chamber 76. Vacuum applied to the chamber 76 in this manner closes the check valve 90 and reduces the pressure in the chamber 76. The reduced pressure in the chamber 76 opens the check valve 83 in the branch conduit 82 and closes the check valve 81 in the branch conduit 80. With the system in this status, a mixture of air and gasoline vapors, and condensed liquid gasoline is drawn from the vacuum conduit 40 connected to the heat exchange coil into the branch conduit 82 and into the chamber 76 below the baffle 78.

Liquid gasoline begins to accumulate in the bottom of the chamber 76, and as the level of the gasoline rises therein, the floats 116 are buoyed upwardly and the rod 108 is caused to move vertically in its guide brackets 110 and 112. After the level of the gasoline has risen to a height immediately below the baffle 78, the rod 108 is moved upwardly by a sufficient distance that the vacuum being applied through the branch vacuum conduit 86 acts on the seat 106, and draws the seat 106 against the open end of the branch conduit to seal the branch conduit and stop the evacuation of the chamber 76. At this point in time, the pressure within the chamber 76 above the liquid gasoline is considerably below atmospheric pressure and therefore air and gasoline vapor, as well as condensed liquid gasoline, continue to be drawn from the vacuum conduit 40 through the branch conduit 82 and into the chamber 76 so that some additional liquid gasoline is accumulated in the chamber 76 and rises in the chimney 80. A very small amount of additional gasoline will cause a substantial increase in the height of the surface level of gasoline in the chimney 80 and this will, in turn, cause a relatively large vertical movement of the gasoline drain float 120.

As the gasoline drain float 120 moves upwardly, the chain 126 is pulled upwardly a corresponding amount and the floating seat 134 is moved from its sealing position over the branch conduit 94 of the gasoline return line 46. The floating seat 134 functions similarly to the float used in a water closet fixture; that is, once the suction on the float seat is broken and the seat has been lifted upwardly in the body of gasoline, gasoline may drain through the branch conduit 94, and the float seat 134 will not reseat due to its buoyancy until such time as the surface level of the gasoline is quite low in the chamber 76 and the float is permitted to settle downwardly as it rides on the surface of the gasoline.

As the gasoline drains from the chamber 76, the seat 106 remains in its sealing position over the branch vacuum conduit 86 due to the vacuum applied thereto until such time as enough of the gasoline has drained from around the vacuum control float system 102 to permit the weight of this assembly to break the vacuum causing the seat 106 to close the branch vacuum conduit 86. In other words, as the gasoline level in the chamber 76 continues to drop, the downward force acting on the vacuum control float system 102 as a result of its weight increases until the gas reaches a level somewhere below the lowermost float 116 of the assembly. At this time, the seat 106 will drop away from the branch vacuum conduit 86 and vacuum will again be applied to the chamber 76.

It should be pointed out that once the pressure within the chamber 76 has become equalized or nearly equalized with the atmospheric pressure surrounding the chamber, the check valves 81 and 83 in the branch conduits 82 and 80, respectively, are closed and open, respectively, so that vacuum being applied to the chamber 74 acts through the branch conduit 80 to draw air and gasoline into the latter chamber. At the same time that the pressure equalization occurs between the chamber 76 and the surrounding atmosphere, the check valve 90 will open to the atmosphere so that the liquid gasoline contained therein can drain from the chamber through the gasoline return line 46 to the gasoline storage tank 12 to the rear of the automobile.

At the time that the check valves 81 and 83 open to place the branch vacuum conduit 80 in communication with the vacuum conduit 40, the seat 106 on the vacuum control float system 102 in the tank 74 is just falling away under gravitational influence from the open end of the branch vacuum conduit 84. Thus, vacuum is, at this time, restored to the chamber 74 and the chamber commences to draw air and gasoline through the branch vacuum conduit 80 into the chamber 74. This time will correspond approximately to the time the gasoline commences to drain from the chamber 76 in the manner hereinbefore described. Thus, as the gasoline is draining from the chamber 76, the gasoline is accumulating in the chamber 74 and the vacuum control float system 102 begins to be actuated so that the rod 108 rises vertically, moving the seat 106 toward the branch vacuum conduit 84. The sequence of filling and draining then occurs in the chamber 74 in the same manner as has been described with respect to the chamber 76, and the filling and emptying of the two chambers proceeds continuously in alternate fashion as described. It should be pointed out that the check valves 98 and 100 in the branch lines 92 and 94 of the gasoline return line 96 are lightly loaded so that the hydrostatic head acting thereon easily opens these check valves to permit flow to the gasoline storage tank, but the valves 98 and 100 function to check the flow of gasoline vapors or liquid gasoline from the gasoline storage tank 12 into the double chambered vacuum tank at such time as the refrigeration system is not in operation.

A further modification of the invention is illustrated in FIGURE 6. Here the air induction line 34 enters a manifold 150 from which a plurality of branch air lines 152–162 extend. The branch air lines 152–162 enter a large heat exchange coil 164 at points spaced along the length of the coil. The heat exchange coil 164 may be considered as having two banks 164a and 164b interconnected by a central loop 166 which receives one end of the vacuum conduit 40.

The gasoline inlet conduit 26 extends from its associated control valve 32 into a gasoline distribution manifold 179 from which a number of branch conduits 168–178 extend. The branch conduits 168–178 enter the heat exchange coil 164 adjacent the end of the vacuum conduit 40 and extend varying distances along the coil into the two banks 164a and 164b thereof so as to terminate, in each case, in proximity to the end of one of the branch air lines 152–162. It will be noted in referring to FIGURE 6 that the end of each of the branch conduits 168–178 is turned back upon itself in a direction facing away from the opening in the end of the corresponding branch air line so as to avoid freezing up of the gasoline branch conduits in the manner hereinbefore described.

To thermostatically control the operation of the system illustrated in FIGURE 6, a thermostatic element 180 is provided in the vicinity of the heat exchange coil 164 for sensing the temperature of the environment around the coil. The thermostatic element 180 is electrically connected to the battery 18 and a solenoid valve 182 disposed in the vacuum conduit 40 so that the application of vacuum to the heat exchange coil 164 to draw air and gasoline thereinto can be thermostatically controlled.

The primary advantage which characterizes the system in FIGURE 6 with respect to the simpler systems having only a single air intake line and gasoline conduit extending into the heat exchange coil is the colder environment which can be created with the multiple-source system, and the ability to easily and conveniently use this system as either a freezer or air conditioner, depending on the setting of the thermostatic controls. Thus, by setting the thermostatic control on high (low temperature) and running the system continuously, it can be used effectively as a freezer. This can also be accomplished by disconnecting the thermostatic control.

From the foregoing description of the invention, it will have become apparent that the present invention provides an improved gasoline operated air conditioning or refrigeration system which can be utilized effectively in an automobile. The refrigeration and air conditioning system of the invention does not expend or utilize any significant amount of the gasoline fuel, and does not adversely affect the idling of the automobile engine. Temperatures well below zero are obtainable with the heat exchange coils of the invention, and the cost of construction of the system is relatively low.

Although certain exemplary and preferred embodiments of the invention have been illustrated herein in order to illustrate to those skilled in the art, the best method of practicing the invention, certain equivalent structures constituting modifications of the precise apparatus shown herein will occur to those skilled in the art, but which will yet depend upon and make use of the broad basic principles herein enunciated and which underlie the present invention. For example, with only slight structural modification, and without departure from the functional principles herein described, the invention can be used effectively in truck mounted campers and in mobile homes to provide either refrigeration or air conditioning. All such modifications and innovations which do not depart markedly from the structures herein shown, and which continue to rely upon the basic principles of the invention are deemed to be circumscribed by the spirit and scope of the invention except as the same may be necessarily limited by the appended claims or reasonable equivalents thereof.

I claim:

1. A refrigeration and air conditioning apparatus for use on a gasoline powered vehicle having a gasoline storage tank thereon comprising:
   a heat exchange tubing coil;
   a gasoline inlet conduit extending into the heat exchange coil from one end thereof with the gasoline inlet conduit being adapted for connection at its end outside the heat exchange coil to the gasoline storage tank of the automobile;
   an air induction line open to the atmosphere at one of its ends and having its other end extended into the heat exchange coil and terminating in spaced relation to the end of the gasoline inlet conduit inside the heat exchange coil;
   a source of vacuum;
   vacuum conduit means connecting said source of vacuum to the heat exchange coil for reducing the pressure within the coil over a major portion of the length of the coil;
   a trap in said vacuum conduit means between the source of vacuum and the heat exchange coil for trapping liquid gasoline pulled from the heat exchange coil through the vacuum conduit means toward the source of vacuum; and
   a gasoline return line connected between the trap and the gasoline storage tank on the automobile.

2. Apparatus as claimed in claim 1 and further characterized to include:
   a check valve in the gasoline return line for preventing the flow of gasoline from the storage tank to the trap when the vacuum conduit means is evacuated by the source of vacuum, and for permitting the flow of gasoline from the trap to the storage tank when the source of vacuum is de-energized.

3. Apparatus as claimed in claim 1 and further characterized to include control valves in each of said air induction line and said gasoline inlet conduit for controlling the rate of introduction of air and gasoline to said heat exchange coil.

4. Apparatus as claimed in claim 1 wherein said source of vacuum includes:
   an internal combustion engine on the automobile and having an intake manifold connected to said vacuum conduit means on the opposite side of said trap from said heat exchange coil; and
   an auxiliary vacuum pump connected to said vacuum conduit on the opposite side of said trap from said heat exchange coil; and
   means for selectively operating said auxiliary vacuum pump alternately with the operation of said internal combustion engine.

5. Apparatus as claimed in claim 1 wherein said trap comprises:
   a double chambered vacuum tank; and
   means for alternately filling and emptying the two chambers of said vacuum tank.

6. Apparatus as claimed in claim 1 wherein said vacuum conduit means is connected to one end of said heat exchange coil, and wherein said air induction line and gasoline inlet conduit enter the other end of said coil with the end of said gasoline inlet conduit being spaced inwardly in said coil from the end of said air induction line which is located therein, and opening away from said air induction line.

7. Apparatus as claimed in claim 6 wherein the end of said gasoline inlet conduit inside said coil is spaced from 1 to 2 inches from the end of said air induction line.

8. Apparatus as claimed in claim 5 wherein said means for alternately filling and emptying the two chambers of said vacuum tank comprises:
   a vacuum control float system in each of said chambers and having a fluid actuated seat thereon for stopping the evacuation of the respective chambers when liquid gasoline therein reaches a predetermined level; and
   a gasoline drain control system in each of said chambers for draining the liquid gasoline from each of the chambers of said double chambered vacuum tank, said control systems each including
   a vertically extending shaft having a float seat on the lower end thereof for sealing a discharge opening in the bottom of the respective chambers;
   a float; and
   a flexible member interconnecting the upper end of said shaft and said float.

9. Apparatus as claimed in claim 3 and further characterized to include a check valve in said air induction line between the control valve therein and the end thereof open to the atmosphere.

10. Apparatus as claimed in claim 1 wherein said source of vacuum comprises an electrically powered vacuum pump adapted to be powered by the storage battery of said automobile.

11. A refrigeration system adapted for connection to the intake manifold and gasoline tank of an automobile during operation, said system including:
   a heat exchange tubing coil;

an air induction line having one of its ends extending into one end of said heat exchange coil, and having its other end open and outside said coil;

a control valve in said air induction line and outside said coil for controlling the rate of admission of air to said coil via said air induction line;

a check valve in said air induction line for preventing flow of gasoline from inside said coil to the outside thereof via said air induction line;

gasoline inlet capillary tubing extending into said heat exchange coil at the same end thereof which receives said air induction line and having an end spaced inwardly in said coil and opening away from the end of said air induction line which is inside said coil, said gasoline inlet tubing being wrapped in several convolutions around a portion of said air induction line in said heat exchange coil;

a control valve in said gasoline inlet tubing and outside said heat exchange coil for controlling the rate of admission of gasoline to said heat exchange coil; and conduit means connected to said heat exchange coil and adapted for connection to a source of vacuum.

12. A heat exchange system adapted for connection to a source of vacuum and the gasoline tank of an automobile comprising:

a heat exchange tubing coil;

an air induction line having an open end adapted to receive air from the atmosphere and an end connected to a manifold;

a plurality of branch air lines extending from said manifold into said heat exchange coil and having ends inside said coil spaced from each other over the length thereof;

a control valve in said air induction line for controlling the rate of admission of air to said coil via said air induction line;

a gasoline inlet conduit adapted for connection at one of its ends to said gasoline tank;

a gasoline manifold connected to the other end of said gasoline inlet conduit;

a control valve in said gasoline inlet conduit for controlling the rate of flow of gasoline from the gasoline tank to said gasoline manifold;

a plurality of gasoline branch conduits corresponding in number to the number of said branch air lines, said gasoline branch conduits having one of their ends connected to said gasoline manifold and their other ends, in the case of each, extending into said heat exchange coil into proximity to the respective ends of said branch air lines;

a vacuum conduit connected to said heat exchange coil and adapted for connection to said source of vacuum; and means for automatically opening and closing said vacuum conduit in response to variations of the temperature of said heat exchange coil.

13. A heat exchange system as claimed in claim 12 wherein the ends of said gasoline branch conduits inside said heat exchange coil open in a direction facing away from the nearest adjacent end of one of said branch air lines.

References Cited by the Examiner

UNITED STATES PATENTS

| | | | |
|---|---|---|---|
| 2,517,156 | 8/1950 | Zapart | 62—7 |
| 2,872,790 | 2/1959 | Simpson | 62—7 |
| 3,130,554 | 4/1964 | Andrea | 62—7 |
| 3,166,912 | 1/1965 | Patrick | 62—7 |
| 3,170,302 | 2/1965 | Potito | 62—7 |

WILLIAM J. WYE, *Primary Examiner.*